(12) United States Patent
Newman et al.

(10) Patent No.: US 8,582,884 B2
(45) Date of Patent: Nov. 12, 2013

(54) APPROXIMATION OF AN IMAGED OBJECT FROM EDGES DETECTED FROM THE UNDERLYING IMAGE

(75) Inventors: Arthur M. Newman, Sherman Oaks, CA (US); Brandon Crow, Playa Del Rey, CA (US)

(73) Assignee: Raytheon Company, Waltham, MA (US)

( * ) Notice: Subject to any disclaimer, the term of this patent is extended or adjusted under 35 U.S.C. 154(b) by 466 days.

(21) Appl. No.: 12/945,381

(22) Filed: Nov. 12, 2010

(65) Prior Publication Data
US 2012/0121190 A1    May 17, 2012

(51) Int. Cl.
*G06K 9/00* (2006.01)

(52) U.S. Cl.
USPC .......................................... 382/173; 382/103

(58) Field of Classification Search
None
See application file for complete search history.

(56) References Cited

U.S. PATENT DOCUMENTS

| | | | |
|---|---|---|---|
| 6,072,889 A | 6/2000 | Deaett et al. | |
| 7,062,099 B2 | 6/2006 | Li et al. | |
| 7,386,186 B2 | 6/2008 | Ovsiannikov | |
| 7,453,456 B2 * | 11/2008 | Petrov et al. | 345/419 |
| 7,672,484 B2 * | 3/2010 | Wiedemann et al. | 382/103 |
| 7,773,787 B2 | 8/2010 | Tek et al. | |
| 8,280,125 B2 * | 10/2012 | Slabaugh et al. | 382/128 |
| 2005/0201618 A1 | 9/2005 | Tek | |

OTHER PUBLICATIONS

Qiiang Gao, "Extracting Object Silhouettes by Perceptual Edge Grouping," Proceedings of the IEEE, Jan. 1997, pp. 2450-2454.
Joachim S. Stahl and Song Wang, "Edge Grouping Coming Boundary and Region Information," IEEE Transactions on Image Processing, vol. 16, No. 10, Oct. 2007, pp. 2590-2605.

* cited by examiner

*Primary Examiner* — Barry Drennan
(74) *Attorney, Agent, or Firm* — Pierce Atwood LLP; Joseph M. Maraia

(57) ABSTRACT

Processes and systems for use in generating an approximation of an image from its edges project a respective scaled intensity value from each edge into regions abutting positive and negative sides of the edge. Positive and negative composite edge projection maps are generated, each including a respective combination of the projected scaled intensity values. A respective ratio of combined local intensity values is determined for each edge in each of the positive and negative composite maps. Respective intensity values weighted by the respective ratios are projected for each edge into regions abutting positive and negative sides of the edge. Revised positive and negative composite, weighted edge projection maps are generated, each including a respective combination of the projected, weighted intensity values.

14 Claims, 12 Drawing Sheets

FIG. 3A FIG. 3B FIG. 3C FIG. 3D

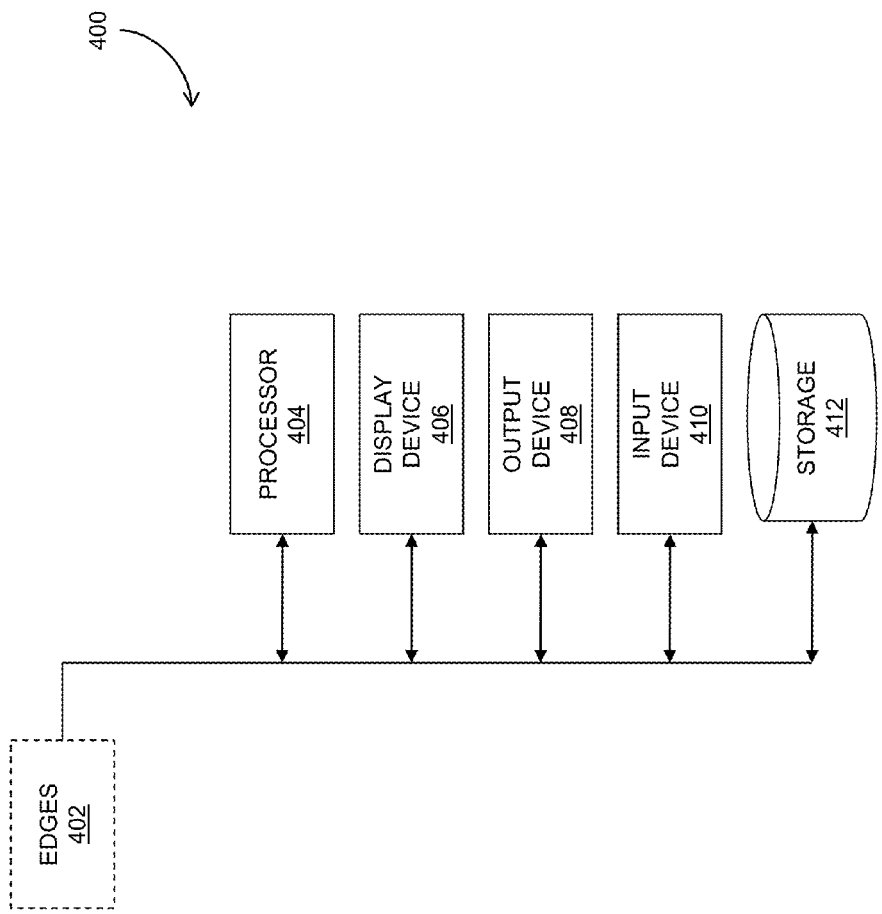

APPROXIMATION OF AN IMAGED OBJECT FROM EDGES DETECTED FROM THE UNDERLYING IMAGE

TECHNICAL FIELD

Various embodiments are described herein relating generally to image processing and the like, and more particularly to generating an image from edges detected within the image.

BACKGROUND

Much work in the field of image processing is directed to automatic processing of images to accurately and reliably detect objects of interest with little or no human intervention. Images can include an immense amount of information. For example, a single color or even grayscale digital image may include millions of pixels, each including information about an associated region of the image. The pixels collectively portray imaged objects that generally give rise to variations in contrast (e.g., a grayscale image). Humans have an ability to inspect images and to readily identify areas of interest, often with minimal effort. Fortunately, human interpretation allow's for rapid processing of vast amounts of information, aided by an ability to quickly form certain judgments, relying on prior knowledge, adding inferences, etc. Automated or machine interpretation can attempt to approximate such a process through expert systems, artificial intelligence, and the like, but typically, at great expense and complexity.

Certain approaches in image processing are directed toward reducing the amount of information necessary for processing, thereby simplifying the task of identifying areas of interest. It is well known that objects portrayed in an image usually give rise to variations in contrast. Certain features of such objects, such as an edge or boundary, can result in areas in the image having particularly strong intensity contrasts at which there may be a jump in intensity from one pixel to the next. Since edges tend to characterize boundaries, techniques for detecting edges are often used to significantly reduce the amount of data, for example, filtering out useless information, while preserving the important structural properties in an image.

Several popular techniques are available to automatically detect edges directly from the image. Such techniques generally rely on spatial differentiation of the image intensity function. The result produces a collection of essentially one-dimensional edges. In the field of feature detection, edges often serve as a starting point. Since edges determined by such techniques generally do not form completely connected boundaries of objects, it is quite often difficult, if not impossible, to determine any reasonable association of the edges to respective objects. Some techniques attempt to identify corners, using such information to connect edges forming shapes. Even with such techniques, it is often difficult to identify the presence of an object from one-dimensional edges alone.

Prior art methods for detecting objects of interest in images are often unable to distinguish between the object of interest and its surroundings. Typical edge detection methods fail because edges that form on unwanted features (i.e., surroundings) are often stronger in intensity than those formed on the object of interest in the image. A need therefore exists for improved systems and methods for detecting objects in an image.

SUMMARY

Edge detection is used to identify points in an image at which the image intensity changes sharply or exhibits discontinuities. Intensity changes and discontinuities often correspond to changes in depth, surface orientation, material properties and/or illumination. Embodiments described herein relate generally to systems and methods for reconstructing an image or otherwise detecting objects within an image from the image's edges.

One embodiment features a process for receiving a plurality of edges derived from an image. Each edge has positive and negative opposing sides, an edge magnitude and a respective direction. A respective scaled intensity value is projected from each edge into a region abutting a positive side of the edge and into a region abutting a negative side of the edge. Positive and negative maps are generated, each comprising a respective combination of the projected scaled intensity values. A respective ratio of combined local intensity values is determined for each edge in each of the positive and negative maps. Respective intensity values weighted by the respective ratio are projected from each edge into a region abutting a positive side of the edge and into a region abutting a negative side of the edge. Revised positive and negative maps are generated, each comprising a respective combination of respective projected, weighted intensity values. One or more of the resulting positive and negative maps includes one or more features approximating at least some of the objects in the original image.

Another embodiment features a computer program product, tangibly embodied in an information carrier for use in approximating at least some objects in an image from edges detected in the image. Each edge has positive and negative opposing sides, an edge magnitude and a respective direction. A respective scaled intensity value is projected from each edge into a region abutting a positive side of the edge and into a region abutting a negative side of the edge. Positive and negative maps are generated, each comprising a respective combination of the projected scaled intensity values. A respective ratio of combined local intensity values is determined for each edge in each of the positive and negative maps. Respective intensity values weighted by the respective ratio are projected from each edge into a region abutting a positive side of the edge and into a region abutting a negative side of the edge. Revised positive and negative maps are generated, each comprising a respective combination of respective projected, weighted intensity values. One or more of the resulting positive and negative maps includes one or more features approximating at least some of the objects in the original image.

Yet another embodiment features a system for use in approximating at least some objects in an image from edges detected in the image. Once again, each edge has positive and negative opposing sides, an edge magnitude and a respective direction. The system includes means for projecting respective scaled intensity value from each edge into a region abutting a positive side of the edge and into a region abutting a negative side of the edge. The system also includes means for generating positive and negative maps, each comprising a respective combination of the projected scaled intensity values. Means for determining a respective ratio of combined local intensity values for each edge in each of the positive and negative maps are also provided, along with means for projecting respective intensity values weighted by the respective ratio from each edge into a region abutting a positive side of the edge and into a region abutting a negative side of the edge. The system further includes means for generating revised positive and negative maps, each including a respective combination of respective projected, weighted intensity values. One or more of the resulting positive and negative maps includes one or more features approximating at least some of the objects in the original image.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A through FIG. 3D illustrates schematic diagrams of various configurations of an example of a bilinear kernel.

FIG. 4 illustrates a schematic diagram of an embodiment of a system configured for reconstructing an image from image-detected edges.

DETAILED DESCRIPTION

Described herein are embodiments of systems and techniques for generating an approximation of an image from predetermined edges corresponding to objects portrayed in the image.

Figure 1:
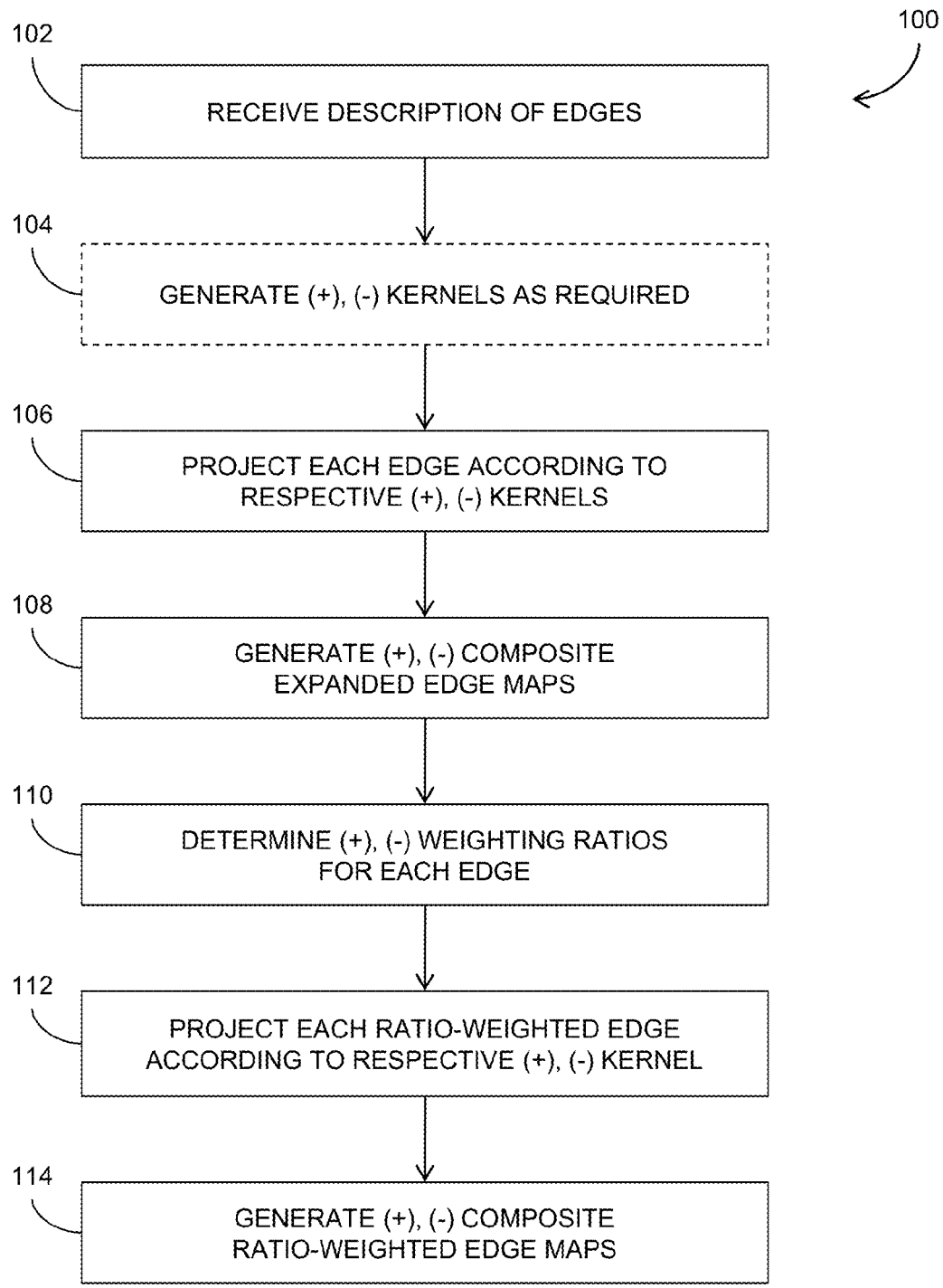
FIG. 1 illustrates a flow diagram of an embodiment of a process for reconstructing an image from image-detected edges.

FIG. 1 illustrates a flow diagram of an embodiment of a process for approximating a portrayal of objects in an image from edges filtered, detected or otherwise identified within the underlying image. Descriptions of more than one such edge are received at 102. A description of each edge includes information related to the edge, such as its direction, its position or center and its magnitude or strength. The edge direction can include a relative angle indicative of a rotational orientation of the edge with respect to some reference. In some embodiments each edge description also includes an edge normal, which is a unit vector in a direction of maximum intensity change. The edge magnitude or strength relates to the local image contrast along the normal. The edge position or center identifies a position within the image at which the edge is located. For example, an edge's position may be defined by a pixel or a pixel's coordinates.

In some embodiments descriptions of the detected edges are received by way of an edge-detected image. Such images can be derived from an underlying image according to any suitable technique for detecting edges. Such algorithms include methods generally known as Canny edge detection and Sobel edge detection.

Edge detected images may lack intensity variations related to the underlying image; however, they would necessarily include edges detected from such intensity variations of the image. Such edges may appear as lines distributed in the image according to respective edge positions or centers and having angular orientations according to respective edge directions. The relative size of an edge operator or filter (e.g., the extent in pixels) may be determined as a result of the particular edge detection operator employed (e.g., 3, 5, 7, or 9 pixels).

Alternatively or in addition, definitions of the detected edges may be received by way of a descriptive file, such as a listing. An example of such a listing is provided below in Table 1. The table includes an edge position or center (e.g., in pixel coordinates), an edge direction (e.g., a relative angle), and an edge magnitude.

TABLE 1

Listing of Detected Edges.

| Position (x, y) | Direction | Magnitude |
|---|---|---|
| 7, 4 | 90° | 10 |
| 4, 6 | 45° | 20 |
| 18, 7 | 135° | 10 |

In some embodiments, one or more edge-projecting kernels are generated or otherwise obtained as required at 104. Any such edge projecting kernels are generated for both positive and negative edge directions. For example, a standard kernel can be defined according to a reference direction or orientation, e.g., projecting from a positive edge of a 0° directed edge. Such a kernel could be applied directly to an edge having a direction of 0°. In particular, the edge projecting kernel has a direction substantially equivalent to the direction of the edge to which it is intended to be applied. In the example edges listed in Table 1, edge directions of 90°, 45°, in 135° would be required.

Additional edge projection kernels can be prepared from such a standard kernel by effectively rotating the standard kernel to match the angle of the edge direction. For discrete kernels, such as those intended for use with pixel images, rotation to some angles will require interpolation. For example, kernels at 45° and 135° will require interpolation; whereas, kernels at 0° and 90° will not.

Edge projecting kernels generally include nonzero values extending into a region adjacent to a preferred edge to which the kernel would be applied. In some embodiments, an edge-projecting kernel takes a magnitude from a central pixel (e.g., the edge position) and multiplies that value by a corresponding kernel value at each pixel location x of the kernel. Positive edge projecting kernels extend away from the edge in a positive sense, that is, in a direction aligned with the edge normal in the maximally positive gradient direction. Negative edge projecting kernels likewise extend into a region adjacent to the edge, but in opposite direction (i.e., in a direction aligned with the maximally negative gradient direction). Positive and negative edge projecting kernels can also extend in width along the edge direction. In at least some embodiments, a width of the kernel is determined in relation to the size of the edge operator or filter. For example, an edge projecting kernel may extend in width (i.e., measured along the edge direction) for 3 or 5 pixels (or any other suitable number of pixels), for edges produced by an edge operator of a predetermined size (e.g., 3 or 5 pixels). It is not necessary that the width of the edge projecting kernel match the size of the edge operator, although, that is a possibility. In at least some embodiments, the width of the edge projecting kernel is slightly less than the size of the corresponding edge operator (e.g., 3 pixel width for a 5 pixel edge operator).

In some embodiments, detected edges can be defined for a limited number of directions. In the examples described herein these directions are 0°, 45°, 90°, and 135°. Once such a limited range of angles has been identified, for example, by the edge definitions as shown in Table 1, rotated edge projecting kernels can be pre-defined or otherwise prepared and stored at least temporarily for use in processing as described herein. As both positive and negative kernels are applied, both positive and negative kernels can be generated and stored separately. Thus for the example edges listed in table 1, six edge projecting kernels would be sufficient for all possible edge directions: positive kernels at 45°, 90°, and 135° and negative kernels at 45°, 90°, in 135°.

In a first pass, each edge is projected into a region abutting the edge through application of the respective edge projecting kernels described above at 106. Both positive and negative kernels are applied separately to each edge. Thus, for the example edges listed in Table 1, a positive kernel at 90° rotation would be applied to the first edge positioned at 7,4; a positive kernel at 45° rotation would be applied to the second edge at 4,6; and a positive kernel at 135° rotation would be applied to the third edge at 18,7. Likewise, negative kernels at 90°, 45° and 135° rotations would be applied to the first, second and third edges.

The edges are generally centered or otherwise positioned at the identified coordinates. Pixels may have an associated value, such as a magnitude or strength of the edge. Other pixels not associated with an edge may have a zero or otherwise neutral magnitude value. Application of the edge projecting kernels projects nonzero or non-neutral intensity values from each edge into a region adjacent to the edge as identified by the positive or negative sense of the respective kernel. Thus, pixel intensity values of a common kernel can be scaled according to the magnitude of the edge to which it is applied. Each edge results in respective positive and negative projections according to the edge direction and scaled according to the edge magnitude.

Composite edge projection maps ("composite maps") are generated for each of the positive and negative edge projections at 108. For example, if the pixel intensity values generated by the projection of each edge by a respective positive kernel are stored separately, they can be combined in a pixelwise summation or superposition of all such edges associated With the same underlying image. Pixel intensity values for a given positive edge projection are summed together with pixel intensity values of all other positive projected edges at each respective pixel. Consequently, a pixel map representative of the combined intensities of all positive edge projections is obtained, referred to herein as a positive composite map. An intensity value for each pixel of the positive composite map can be represented by $P_{MAP}(x,y)$. The same process is repeated for negative edge projections resulting in a negative composite map, with an intensity value for each pixel being represented by $N_{MAP}(x,y)$.

Positive and negative weighting ratios are respectively determined for each edge at 110. The weighting ratios are determined from the pixel intensity values of the positive and negative composite maps. In general, the respective weighting ratios fold or otherwise redistribute pixel intensities (also referred to as energy) from one side of each edge to the opposite side of the same edge. Accordingly, such redistributions selectively move some of the projected-edge intensity values (energy) from a relatively "weak" side of an edge (e.g., that side having a relatively lower total intensity in an abutting region), to a relatively "strong" side of the same edge (e.g., that side of the edge having a relatively greater total intensity in a corresponding abutting region). Since energy is shifted from a weak side to a strong side, the approach is sometimes referred to as a "rich get richer" scheme. The purpose of such a scheme is to enhance the system response to objects in the image, and to reduce 'ringing', or sidelobe artifacts in the final result.

In at least some embodiments, a positive weighting ratio for the $i^{th}$ edge, $P_{RAT}(i)$, is determined as a ratio of the combined pixel intensities of the positive composite map within a region abutting a positive side of the edge, to the combined pixel intensities of the negative composite map within a similar region abutting a negative side of the edge.

$$P_{RAT}(i) = \frac{\sum_x P_{MAP}(i, x)}{\sum_x N_{MAP}(i, x)} \qquad \text{Eqn. 1}$$

Other quantities, such as percentage, could replace the ratio function in the "rich get richer" scheme.

The edge-abutting regions can be defined, for example, by a suitably oriented edge-projection kernel having x cells or pixels. In at least some embodiments, the same kernels used for projecting energy from the edges can be reused, for example, without scaling. In such reapplication, however, the suitably directed kernel is positioned at the edge location and pixel values of the kernel are multiplied by corresponding pixel intensity values of the composite map. Accordingly, a respective kernel is applied to the $i^{th}$ edge, capturing pixel intensities (energy) in each of the non-zero pixels mapped by the kernel. Thus, for each edge in the positive composite image, a positive kernel is applied to the composite expanded edge map, suitably aligned with the edge, and having an extent of x pixels, such that a positive sum $P_{MAP}(i)$ can be formed for the $i^{th}$ edge according to $\Sigma_x P_{MAP}(i,x)$. Likewise, a sum of all pixel intensities in the kernel-defined region of the $i^{th}$ edge in the negative composite image can be formed according to $\Sigma_x N_{MAP}(i,x)$.

A negative weighting ratio for the $i^{th}$ edge $N_{RAT}(i)$ can be similarly determined as a ratio of the combined pixel intensities of the negative composite expanded edge map within a region abutting a negative side of the edge, to the combined pixel intensities of the positive composite expanded edge map within a similar region abutting a positive side of the edge.

$$N_{RAT}(i) = \frac{\sum_x N_{MAP}(i, x)}{\sum_x P_{MAP}(i, x)} = \frac{1}{P_{RAT}(i)} \qquad \text{Eqn. 2}$$

In a subsequent pass, each edge is once again projected according to its respective weighting ratio according to each of the positive and negative kernels at 112 similar to the edge projections described above. In a significant difference, however, each kernel is scaled according to the edge weighting ratio $P_{RAT}(i)$, $N_{RAT}(i)$, not the edge magnitude. For example, the same basic kernel used for edge projection can be scaled according to the respective weighting ratio. Thus, for each edge i, a weighted edge-projection is produced by application of a suitably oriented kernel, scaled by the positive ratio for the $i^{th}$ edge, $P_{RAT}(i)$ producing a weighted edge projection. The process is repeated for each of the other edges and the results combined in a common ratio-weighted edge projection map at 114. For example, a positive ratio-weighted, composite edge projection map ("weighted composite map") can be generated by a superposition or pixelwise sum of projected, weighted intensities (energy) from each of the positive edges of the image. Likewise, a negative ratio-weighted edge-projection map can also be generated by a superposition or pixelwise sum of projected, weighted intensities (energy) from each of the negative edges of the image.

Figure 2:
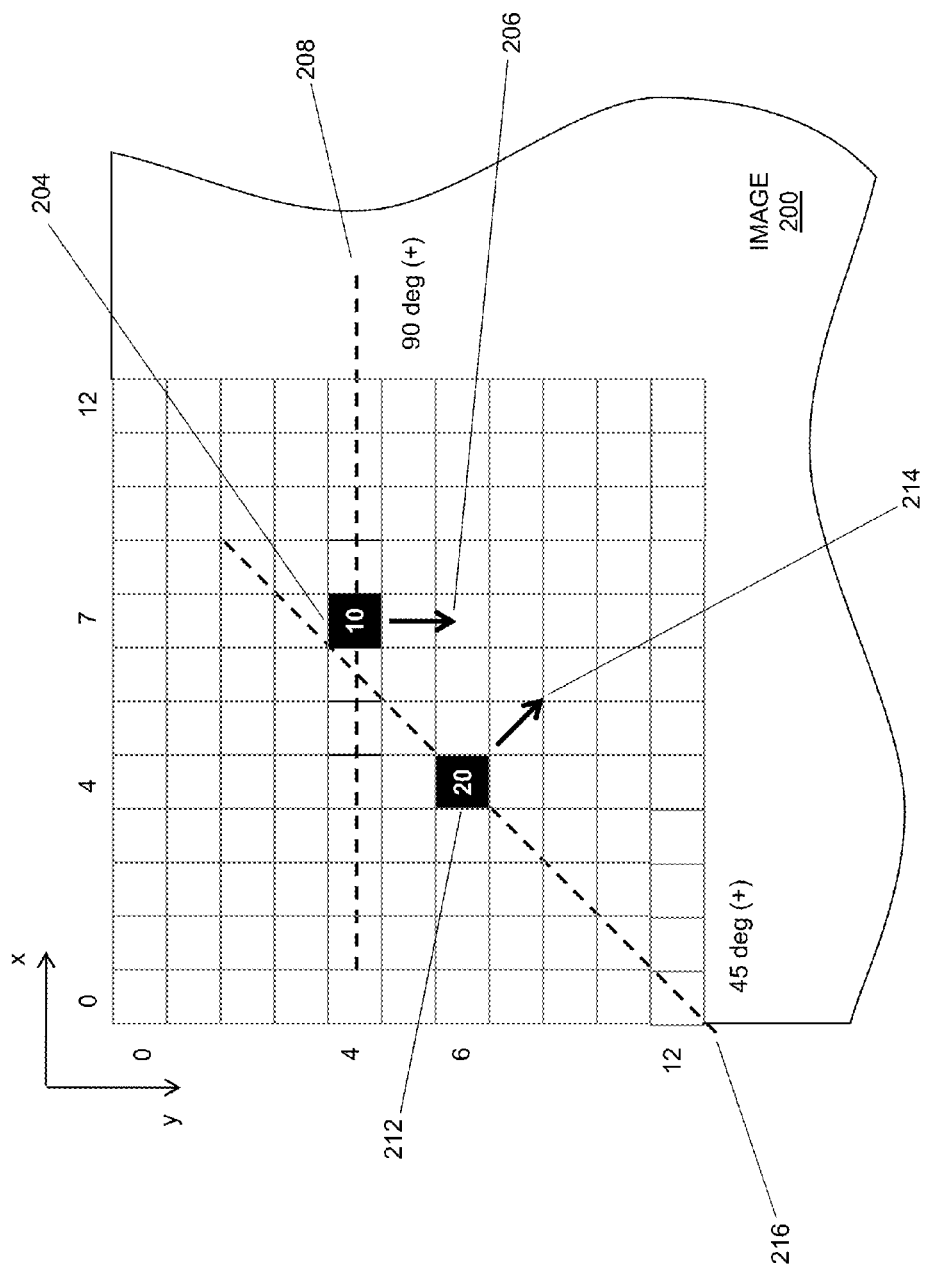
FIG. 2 illustrates a schematic diagram of an example of a portion of an edge-detected image.

FIG. 2 illustrates a schematic diagram of an example of a portion of an edge-detected image 200. The image includes an array of pixels defined at respective x and y coordinates. In this example, the upper left-most pixel is referenced to pixel location 0,0. For a grayscale image, each pixel has an associated intensity value, which relates to a corresponding shade of gray. Also shown in the image are the first two edges listed in Table 1. The first edge was generated, for example, by a 5 pixel-by-5 pixel edge detector, and is represented by a first edge pixel 204. It is understood that an edge pixel can represent a single point, not necessarily being associated with a one-dimensional array of pixels. The edge pixel is also associated with indicia of the edge (e.g., its position, direction, magnitude). For example, the first edge pixel 204 is located at pixel coordinate 7,4 (the edge position) and has an associated intensity value of 10 (the edge magnitude or strength). Also shown is a corresponding edge normal 206 extending in the maximum positive gradient direction perpendicular to the edge direction, in the direction of the y-axis. A dashed line 208 also represents the direction of the edge, in this instance, 90° with reference to the negative y-axis. Likewise, a second edge also generated by the 5 pixel-by-5 pixel edge detector is represented by a second edge pixel 212 located at pixel coordinate 4,6 and having an associated intensity value (strength) of 20. A corresponding edge normal 214 extends in the maximum positive gradient direction perpendicular to the edge direction. A dashed line 216 represents the direction of the edge, in this instance, 45°. The third edge in Table 1 as well as any other edges as may be detected in the underlying image would be portrayed in a similar manner.

In some embodiments, the edge-detected image 200 is received at 102 (FIG. 1) in place of any listing as in Table 1. Alternatively or in addition, the edge detected image 200 can be generated from the detected edges listed in Table 1, for example, as a reference image to display the particulars of the detected-edges processed as described herein.

Figures 3A, 3B, 3C, 3D:
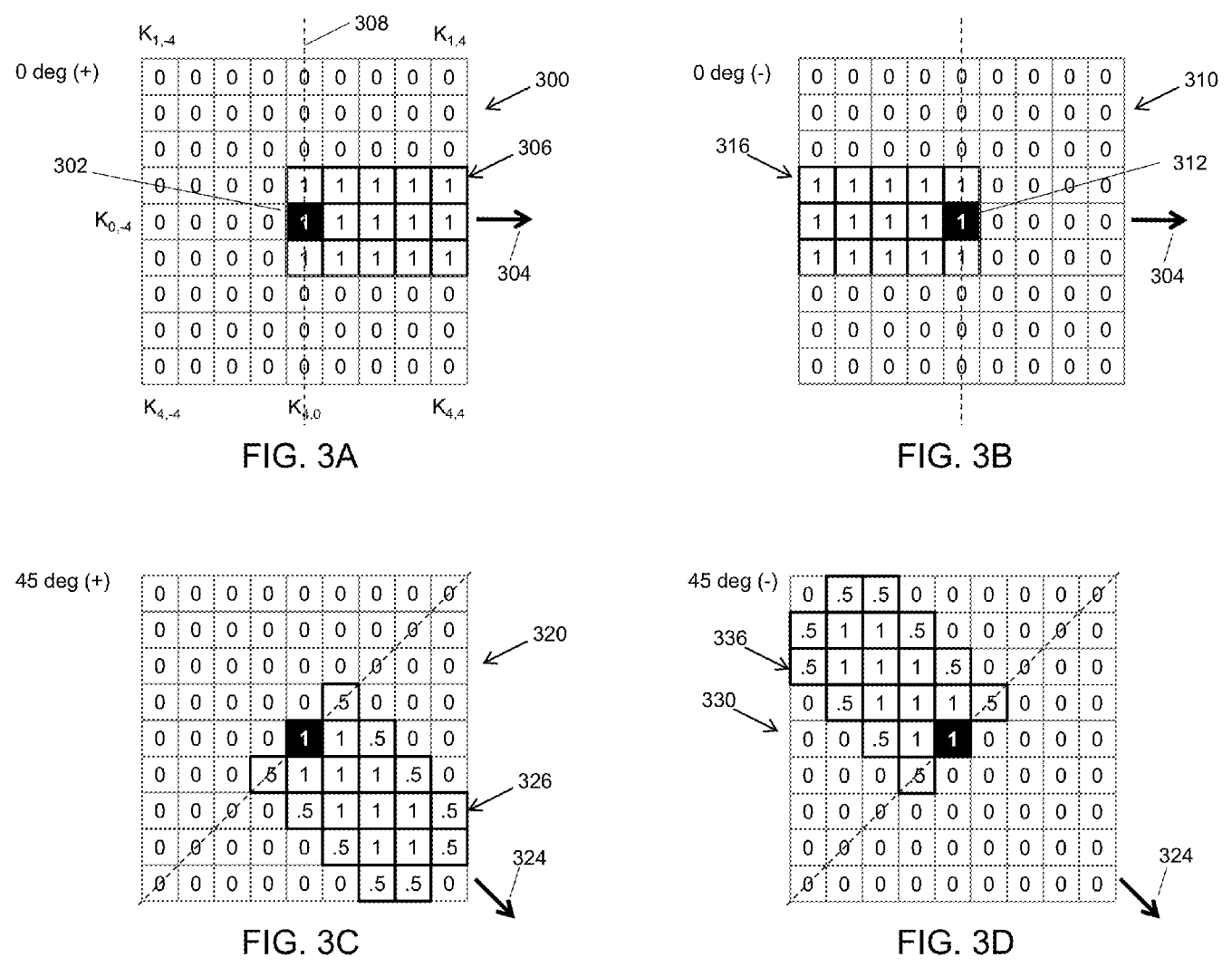

By way of illustrative example, a basic edge-projection kernel 300 is shown in FIG. 3A. The kernel is defined within a 9×9 array (e.g., pixel array). All pixel values are zero, except for a 3×5 sub-array of pixels 306 extending outward and to the right of a central pixel 302. The basic kernel, in this example, is aligned for application to 0° edge, extending intensity values from the edge into a region abutting a positive side of the edge, denoted by the edge normal 304. It is envisioned that basic kernels having other combinations of size, shape and scaling can be similarly defined. For example, instead of the rectangular sub-array 306, other shapes, such a pyramidal, or trapezoidal can be applied. A base of such nonrectangular shape can be aligned along the edge direction 308, or opposite the edge direction, thereby projecting more energy away from the edge 308.

In the illustrative example, the edge intensity is projected uniformly into the abutting region defined by the 3×5 sub array 306 of the kernel 302. It is contemplated that in at least some embodiments, such projections can be tapered or otherwise scaled. For example, the 1's in the 3×5 sub-array of pixels 306 can be replaced with different scalar values, for example, decreasing in magnitude with distance from the edge. Such a taper could be applied in a linear fashion, e.g., by scaling values of the kernel's non-zero pixels according to an interpolation between maximum and minim values. Alternatively or in addition, such scaling can be accomplished according to other relationships, such as functional relationships (e.g., a Gaussian interpolation).

FIG. 3B shows an example of a corresponding basic edge-projection kernel 310 also aligned for application to 0° edge, but extending intensity values away from the edge into a region abutting a negative side of the edge opposite the edge normal 304. Once again, all pixel values are zero, except for a similar 3×5 sub-array of pixels 316 extending outward and to the left of a central pixel 312. The negative kernel can be viewed as a mirror image of the positive basic kernel folded about the edge 308.

FIG. 3C and FIG. 3D respectively show examples of a corresponding positive and negative basic edge projection kernels 320, 330 aligned for application to 45° edge having an edge normal 324 as shown. Each 45° kernel 320, 330 includes a respective non-zero sub-array 326, 336 corresponding to the same 3×5 basic kernel, effectively rotated by the angle of the edge direction. Since the 3×5 array of 1's doesn't exactly line up with pixels under such a rotation, non-zero kernel values can be determined by interpolation. In this example, each sub-array includes 20 non-zero pixels, with ten pixels having a value 1 and ten pixels having a value of 0.5, such that a sum of all non-zero pixel values remains 15, as with the 0° basic kernel. Similar positive and negative kernels can be identified for the other edge orientations of the illustrative examples described herein, namely, 0°, 45°, 90°, and 135°. It should be understood that similar kernels can be mapped to any conceivable edge orientation (e.g.,)175.5°, for example, by applying a similar rotation and interpolation of a basic kernel.

FIG. 4 illustrates a schematic diagram of an example of a system 400 configured for reconstructing an image from image-detected edges. As shown, the system receives an input description of edges 402 of an underlying image. The input edges 402 can be an image itself (e.g., an image produced by application of an edge detection filter to the underlying image), a textual description of the edges (e.g., the listing of Table 1), or some combination of image and text. As the description of input edges 402 are not necessarily part of the system, they are shown in phantom. Of course, in some embodiments, an edge detector is provided such that edges can be determined or otherwise'defined for a received image.

The system 400 includes a processor 404 for processing the input edges 402. The processor 404 stores a variety of information about the edges 402 and the system 400, for example, in a storage device 412. The storage device 412 can include one or more storage devices that may be similar or dissimilar. The storage device 412 can include, for example, long-term storage (e.g., a hard drive, a tape storage device, flash memory), short-term storage (e.g., a random access memory, a graphics memory), and/or any other type of computer readable storage. At least a portion of the storage device 412 may be collocated with the system 400. Alternatively or in addition, at least a portion of the storage device 412 may be located remotely from the system 400, for example being accessible by a network (not shown).

The modules and devices described herein can, for example, utilize the processor 404 to execute computer-executable instructions and/or include a processor to execute computer-executable instructions (e.g., an encryption processing unit, a field programmable gate array processing unit). It should be understood that the system 400 can include, for example, other modules, devices, and/or processors known in the art and/or varieties of the illustrated modules, devices, and/or processors.

An input device 410 receives information associated with the system 400 (e.g., instructions from a user, instructions from another computing device) from a user (not shown) and/or another computing system (not shown). The input device 410 can include, for example, a keyboard, scanner or mouse or other suitable pointing device. An output device 408 provides as output, information associated with the system 400 (e.g., information to a printer (not shown), information to an audio speaker (not shown)).

A display device 406 displays information associated with the system 400 (e.g., status information, configuration information). In at least some embodiments, the processor 404 executes an operating system and/or any other computer executable instructions for the system 400 (e.g., processes the input edges 402 to reconstruct an underlying image).

Figure 5:
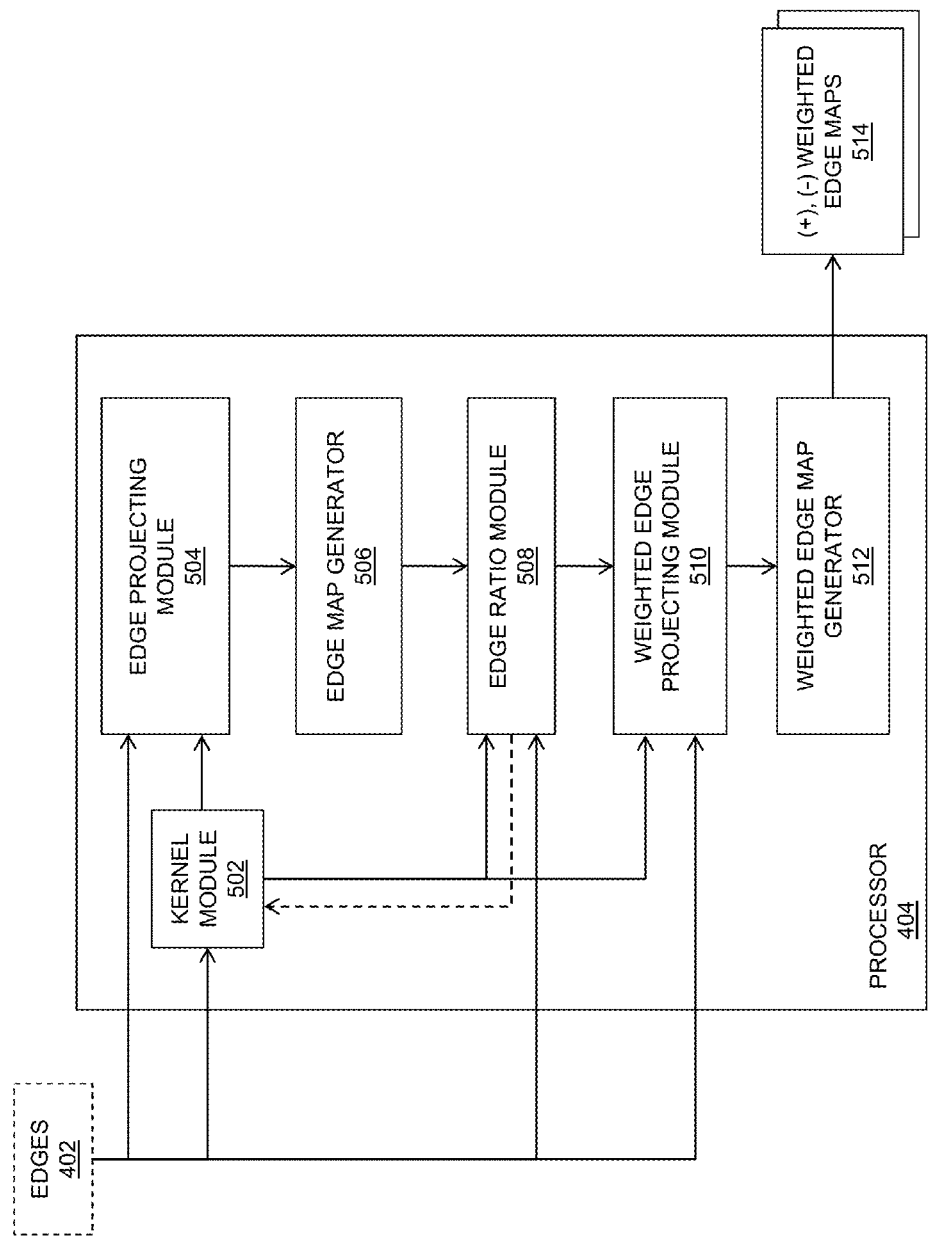
FIG. 5 illustrates a more detailed schematic diagram of an embodiment of the processor of FIG. 4.

FIG. 5 illustrates a more detailed schematic diagram of an embodiment of the processor 404 of FIG. 4. A kernel module 502 receives information related to the input edges 402 and configures edge-projection kernels, as required, for application to the different edges. For example, the kernel module 502 may store a representation of a basic kernel, such as the basic kernel 300 shown in FIG. 3A. Alternatively or in addition, the kernel module 502 may retrieve such representation of the basic kernel from the storage device 412. The kernel module 502 receives directions for all of the input edges 402 and generates positive and negative representations (e.g., rotated and interpolated, as required) of the basic kernel suitably aligned with each respective edge.

An edge projecting module 504 also receives information related to the input edges 402 and the suitably aligned kernels from the kernel module 502. (Although the process describes edges 402 as being received directly from an external source and kernels being provided directly from the kernel module 502, it is envisioned that one or more of these may be obtained by any one or more of the system modules, such as the storage device 412.) The edge projecting module 504 scales the suitably aligned kernel for each edge according to the edge's magnitude, resulting in a scaled projection of energy from the edge into a respective region abutting each positive and negative side of each edge. In at least some embodiments, results of such edge projections in the form of bitmapped images may be stored or otherwise retained at least temporarily.

For each edge, an edge map generator 506 receives the positive and negative edge projections from the edge projector 504. For embodiments in which such individual edge projections are stored, the edge map generator may receive the projections from system storage 412. The edge map generator 506 generates a positive a composite edge projection map for each image as a combination of all of the positive edge projections of the received edges 402. Similarly, the edge map generator 506 generates a negative composite edge projection map as a combination of all of the negative edge projections of the received edges 402. Such combinations can be obtained from a pixelwise summation of the individual intensity values obtained from each individual edge projection as described above in reference to FIG. 2. In some embodiments, edge projection images for each edge are retrieved and combined. Alternatively or in addition, pre-initialized positive and negative maps (e.g., blank maps having all pixels at a uniform value, e.g., 0) are incrementally updated as edge maps are incrementally received for each edge from the edge projecting module 504.

An edge ratio module 508 receives the positive and negative composite edge maps from the edge map generator 506 (or alternatively from the storage device 412, having been previously stored there by the edge map generator 506). The edge ratio module 508 also receives suitably aligned kernels from the kernel module 502 (or from the storage device 412, having been previously stored there by the kernel module 502). The edge ratio module 508 applies the suitably aligned, unsealed kernel for each edge, capturing composite energy projected from the edges into a respective region abutting each positive and negative side of each edge, for example, as identified by boundaries of the kernel. In at least some embodiments, results of such edge projections in the form of bitmapped images may be stored or otherwise retained at least temporarily. The edge ratio module 508 combines the kernel-adjusted pixel values for each edge of the positive composite edge image, for example, by summing the values for each edge according to $\Sigma_x P_{MAP}(i,x)$. Similarly, the edge ratio module 508 combines the kernel-adjusted pixel values for each edge of the negative composite edge image, for example, by summing the values for each $i^{th}$ edge according to $\Sigma_x N_{MAP}(i,x)$. The edge ratio module 508 generates separate positive and negative ratios $P_{RAT}(i)$, $N_{RAT}(i)$ for each edge as described above in relation to FIG. 2. In some embodiments, either one of the positive and negative ratios $P_{RAT}(i)$, $N_{RAT}(i)$ is generated as a multiplicative inverse of the other.

A weighted edge projecting module 510 receives a suitably aligned kernel for each of the received edges 402 and applies the kernel scaled according to the edge intensity and weighted according to the appropriate weighting ratio $P_{RAT}(i)$, $N_{RAT}(i)$. In some embodiments, the weighted edge projecting module 510 receives information related to the input edges 402, and the suitably aligned kernels from the kernel module 502. The weighted edge projecting module 510 scales the suitably aligned kernel for each edge according to the edge's magnitude and according to the applicable weighting ratio, resulting in a scaled, weighted projection of energy from the edge into a respective region abutting each positive and negative side of the edge. The process is repeated for each edge. In at least some embodiments, results of such edge projections in the form of bitmapped images may be stored or otherwise retained at least temporarily.

For each edge, a weighted edge map generator 512 receives the positive and negative weighted edge projections from the weighted edge projecting module 510. For embodiments in which such individual edge projections are stored, the edge map generator may receive the projections from system storage 412. The weighted edge map generator 512 generates a positive composite weighted edge projected edge map as a combination of all of the positive weighted edge projections of the received edges 402.

Similarly, the weighted edge map generator 512 generates a negative composite weighted edge projection map as a combination of all of the negative edge projections of the received edges 402. Such combinations can be obtained from a pixelwise summation of the individual intensity values obtained from each individual weighted edge projection. In some embodiments, weighted edge projection images for each edge are retrieved and combined. Alternatively or in addition, pre-initialized positive and negative maps (e.g., blank maps having all pixies at a uniform value, e.g., 0) are incrementally updated as edge maps are incrementally received for each edge from the weighted edge projecting module 510.

The weighted edge map generator 512 provides separate positive and negative composite weighted edge projection maps 514. In at least some embodiments, the resulting composite weighted edge projection maps 514 are provided as a grayscale image 514 for further processing and/or for display, for example, by the display device 406. Beneficially, such a processing of detected edges of an underlying image results in a reconstruction of a representation of the original image. Objects having a positive contrast (e.g., lighter shades of gray or white in comparison to their local neighborhood) will be identified in the positive composite weighted edge map 514; whereas, objects having a negative contrast (e.g., darker shades of gray or black in comparison to their local neighborhood) will be identified in the negative composite weighted edge map 514.

Figure 6A:
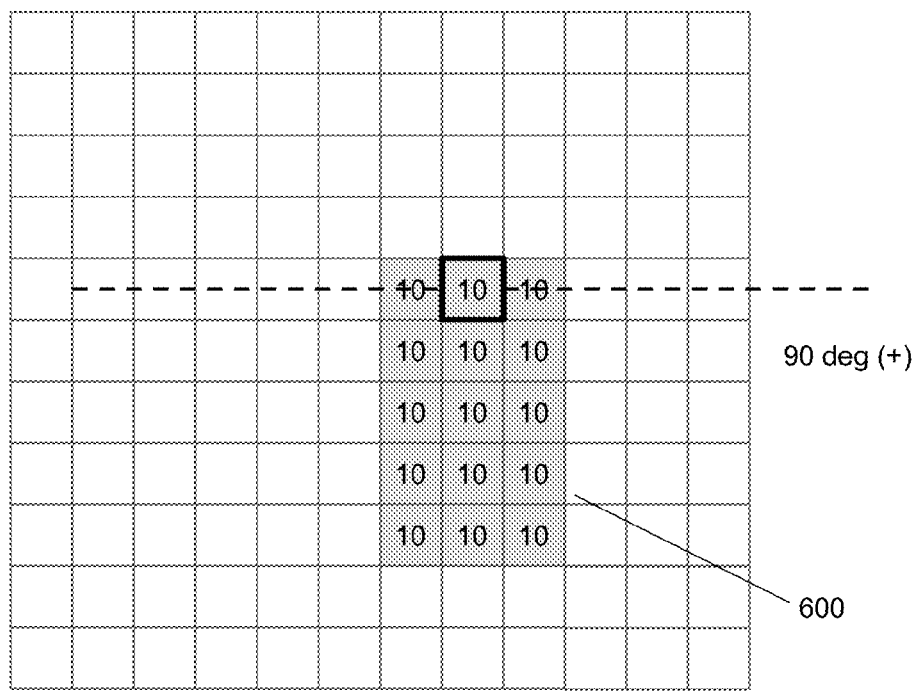
FIG. 6A and FIG. 6B respectively illustrate schematic diagrams of an application of a positive bilinear kernel to the example edges of FIG. 2.
Figure 6B:
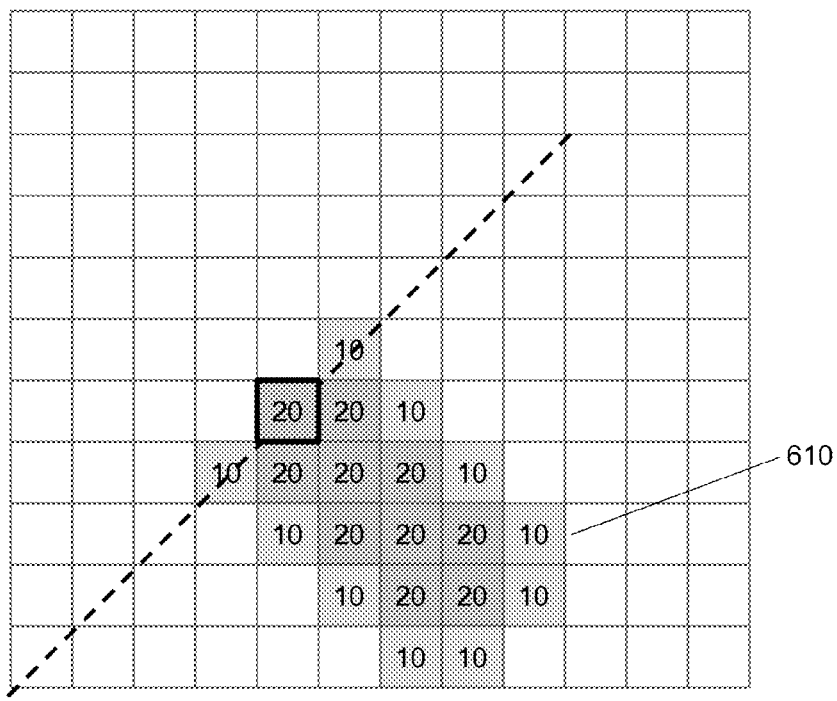
Figure 7A:
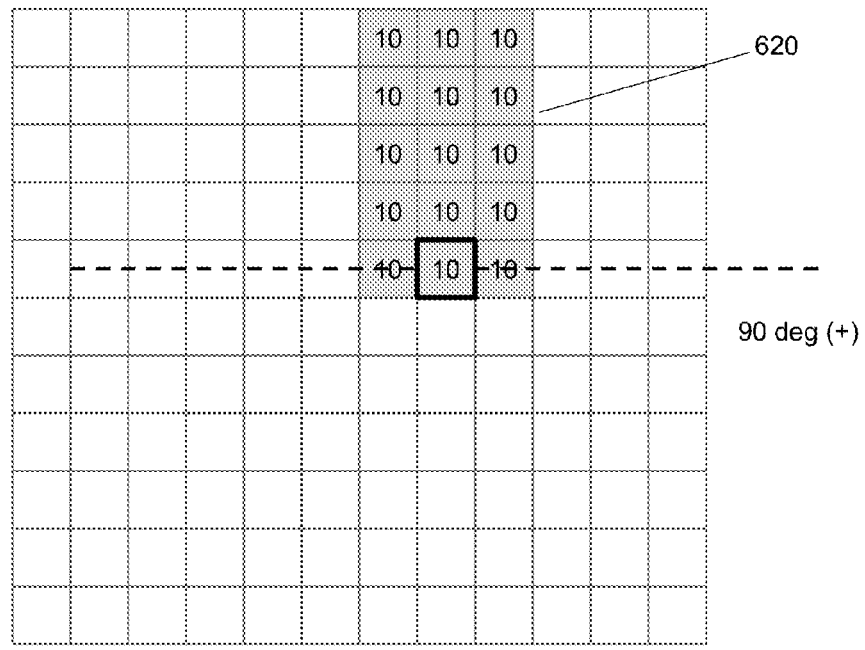
FIG. 7A and FIG. 7B respectively illustrate schematic diagrams of an application of a negative bilinear kernel to the example edges of FIG. 2.
Figure 7B:
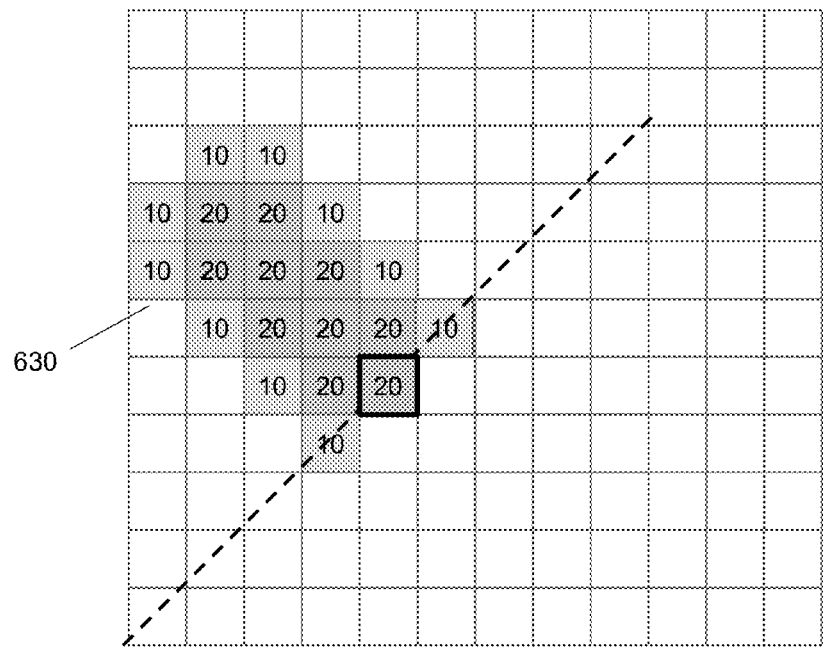

FIG. 6A and FIG. 6B respectively illustrate schematic diagrams of an application of a positive bilinear kernel to the example edges of FIG. 2. Referring first to FIG. 6A, a suitably aligned kernel represented by a 90° rotation of the 3×5 basic kernel of FIG. 3A is applied to the first edge positioned at 7,4. The magnitude of the first edge, 10, is applied to scale each of the 1's of the kernel resulting in the edge projection 600 illustrated. Referring next to FIG. 6B, a suitably aligned kernel represented by a 45° rotation of the 3×5 basic kernel shown in FIG. 3C is applied to the second edge positioned at 4,6. The magnitude of the second edge, 20, is applied to scale each of the non-zero pixels of the kernel resulting in the edge projection 610 as illustrated. Similar applications of suitably aligned negative kernels for each of the first and second edges produce the negative edge projections 620, 630 illustrated in FIG. 7A and FIG. 7B.

Figure 8A:
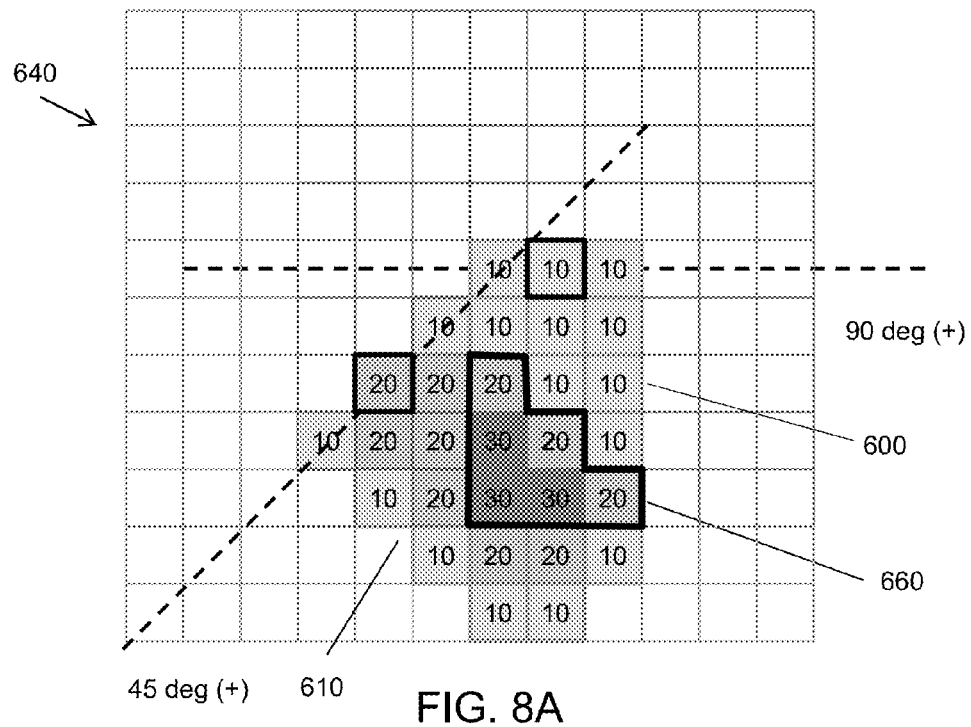
FIG. 8A and FIG. 8B respectively illustrate schematic diagrams of positive and negative composite edge projection maps.

A positive composite edge projection map 640 is illustrated in FIG. 8A. The positive composite map 640 represents a superposition of the positive edge projections 600, 610 of the first and second edges. As can be seen, the respective projected edge pixel intensities are reproduced, except in an overlapping region 660 within which the respective pixel intensities are summed together. The maximum pixel intensity of 30 occurs in this overlap region.

Figure 8B:
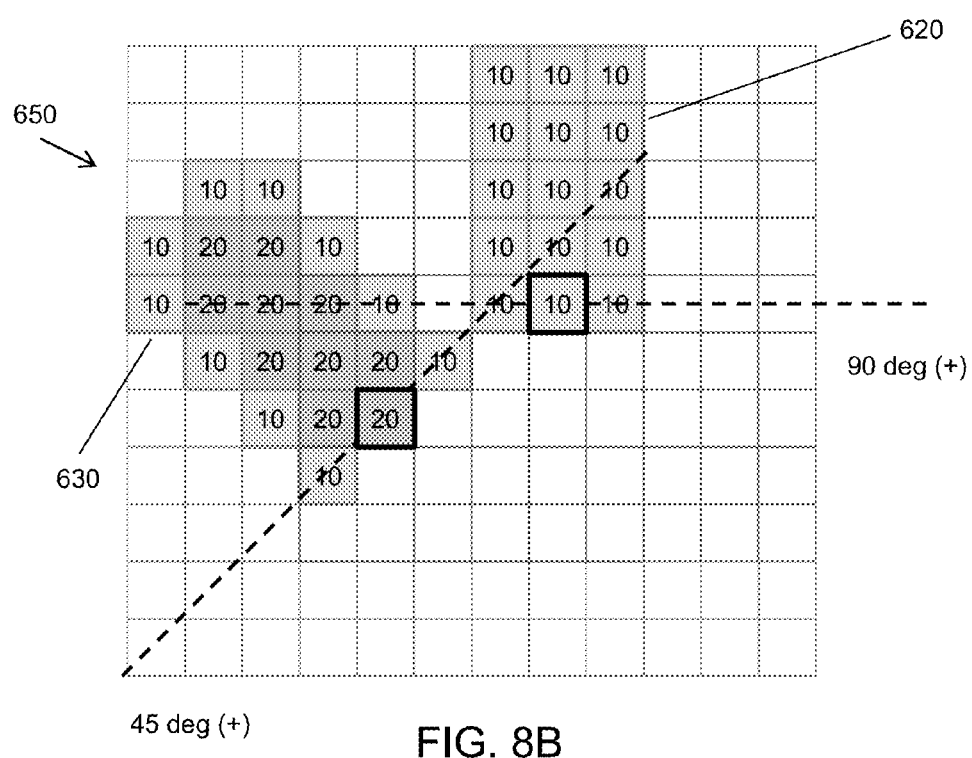

Similarly, a negative composite edge projection map 650 is illustrated in FIG. 8B. The negative composite map 650 represents a superposition of the negative edge projections 620, 630 of the first and second edges. As can be seen, the respective projected edge pixel intensities are reproduced on the same map 650. There is no overlapping region in this image. Thus, the maximum pixel intensity is 20, associated with a negative projection of the second edge.

In order to determine weighting rations, sums of energies on either side of each edge must first be determined from the corresponding composite maps. A sum of energy in a region abutting a positive side of the $i^{st}$ edge can be determined by overlaying the suitably aligned, unscaled kernel, multiplying kernel values by corresponding pixels positive composite map and summing the result. Namely, the result of $\Sigma_x P_{MAP}(1,x)=P_{MAP}(1)$, corresponds to 240. A sum of energy in a region abutting a positive side of the $2^{nd}$ edge, $P_{MAP}(2)$, can be determined similarly and found to be 295. Likewise, sums of energy in regions abutting negative sides of the $1^{st}$ and $2^{nd}$ edges are determined and found to be $N_{MAP}(1)=150$, and $N_{MAP}(2)=250$.

A positive weighting ratio for the $1^{st}$ edge, $P_{RAT}(1)=1.6$ is determined according to Eqn. 1, substituting in the values for $P_{MAP}(1)=240$ and $N_{MAP}(1)=150$. Likewise, a positive weighting ratio for the $2^{nd}$ edge, $P_{RAT}(2)=1.18$ is also determined according to Eqn. 1, substituting in the values for $P_{MAP}(2)=295$ and $N_{MAP}(2)=250$. Negative weighting ratios for each line can be determined according to Eqn. 2 and found to be $N_{RAT}(1)=0.625$ and $N_{RAT}(2)=0.847$.

Figure 9A:
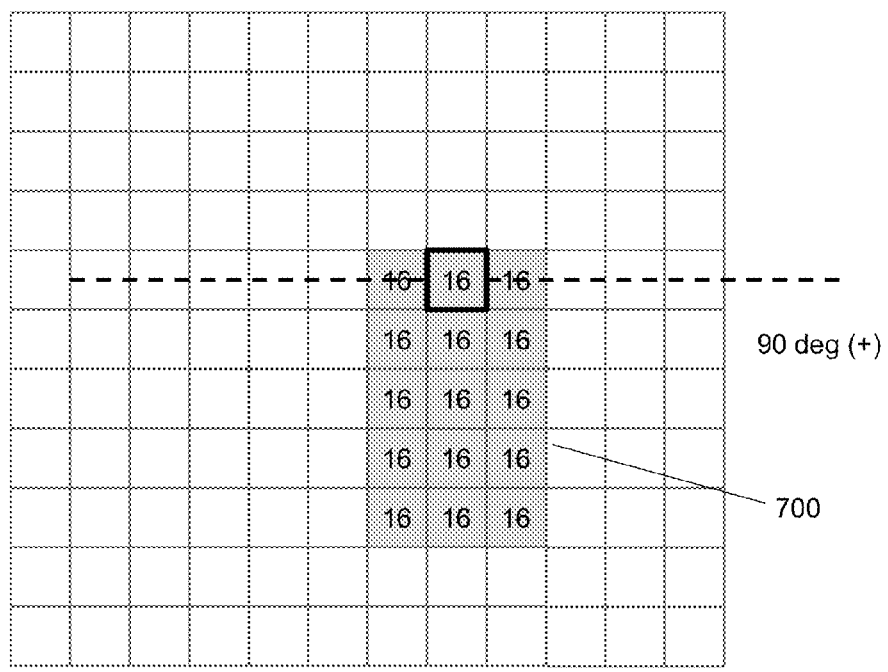
FIG. 9A and FIG. 9B respectively illustrate schematic diagrams of an application of a weighted positive bilinear kernel to the example edges of FIG. 2.
Figure 9B:
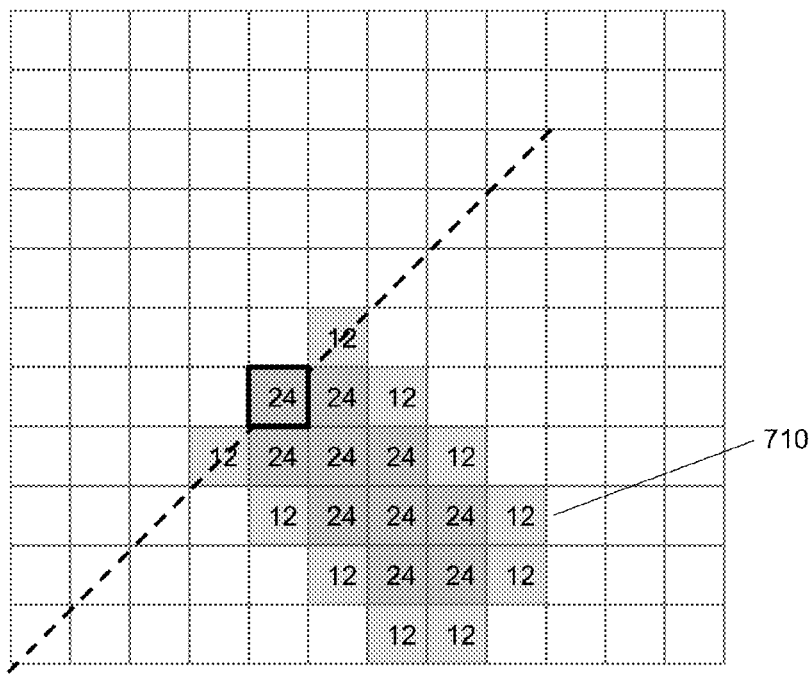
Figure 10A:
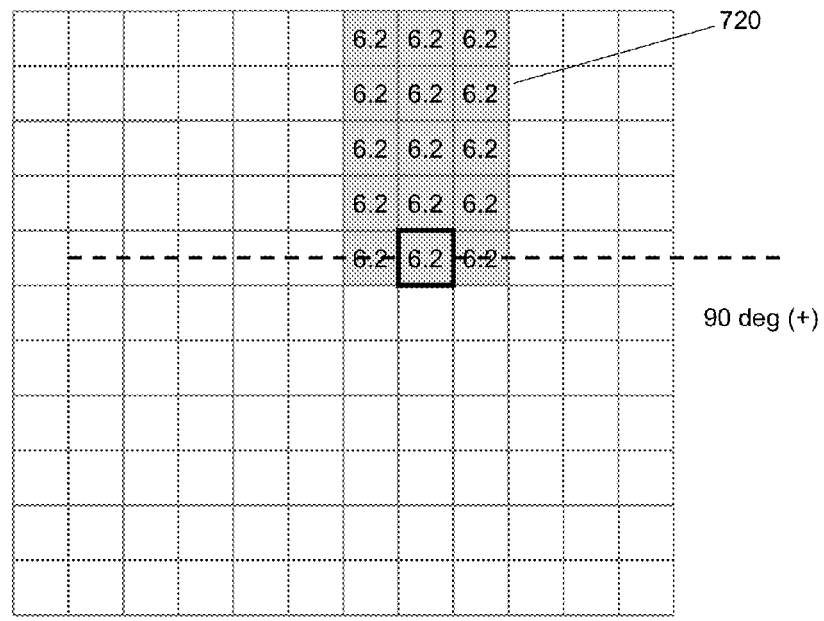
FIG. 10A and FIG. 10B respectively illustrate schematic diagrams of an application of a weighted negative bilinear kernel to the example edges of FIG. 2.
Figure 10B:
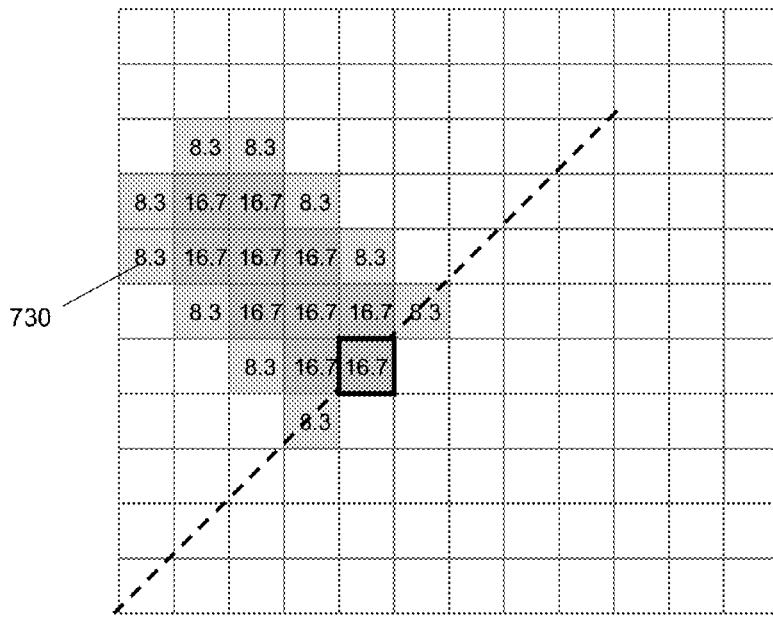

A reapplication of a suitably aligned positive kernel to the first edge is repeated, scaled according to the edge magnitude, 10, and according to the previously determined weighting ratio, 1.6. The resulting ratio-weighted energy 700 projected in to a region abutting a positive side of the first edge is illustrated in FIG. 9A. Similarly, reapplication of a suitably aligned positive kernel to the second edge is repeated, scaled according to the edge magnitude, 20, and according to the previously determined weighting ratio, 1.18. The resulting ratio-weighted energy 710 projected in to a region abutting a positive side of the second edge is illustrated in FIG. 9B. Similar applications of suitably aligned negative kernels for each of the first and second edges, weighted by the appropriate weighting ratio produce the negative edge projections 720, 730 illustrated in FIG. 10A and FIG. 10B.

Figure 11A:
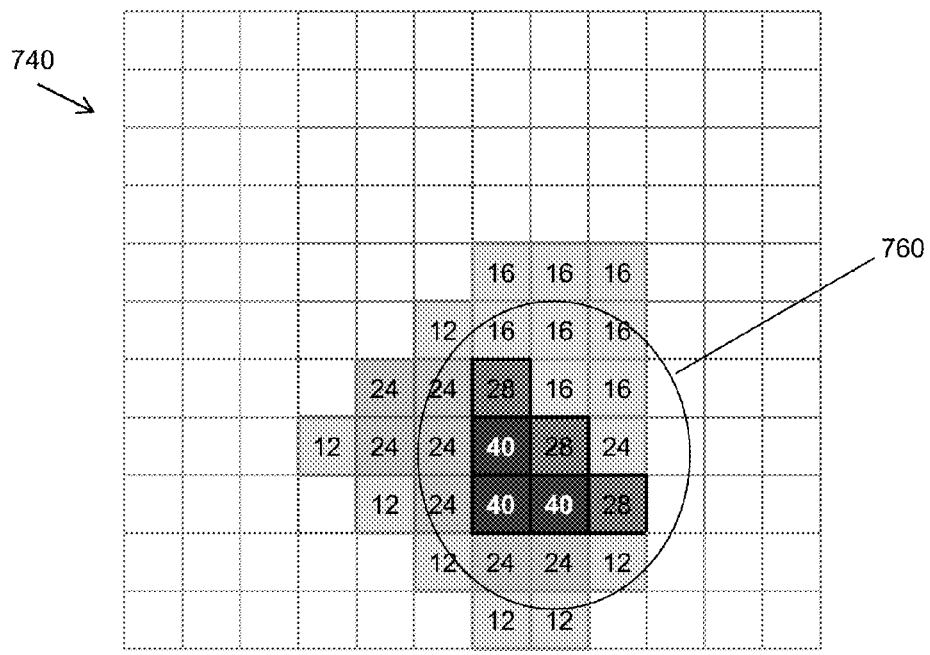
FIG. 11A and FIG. 11B respectively illustrate schematic diagrams of positive and negative projected weighted edge maps.

A positive composite weighted edge projection map 740 is illustrated in FIG. 11A. The positive weighted composite map 740 represents a superposition of the positive weighted edge projections 700, 710 of the first and second edges. As can be seen, the respective projected edge pixel intensities are reproduced, except in an overlapping region 760 within which the respective pixel intensities are summed together. The maximum pixel intensity of 40 occurs in this overlap region.

Figure 11B:
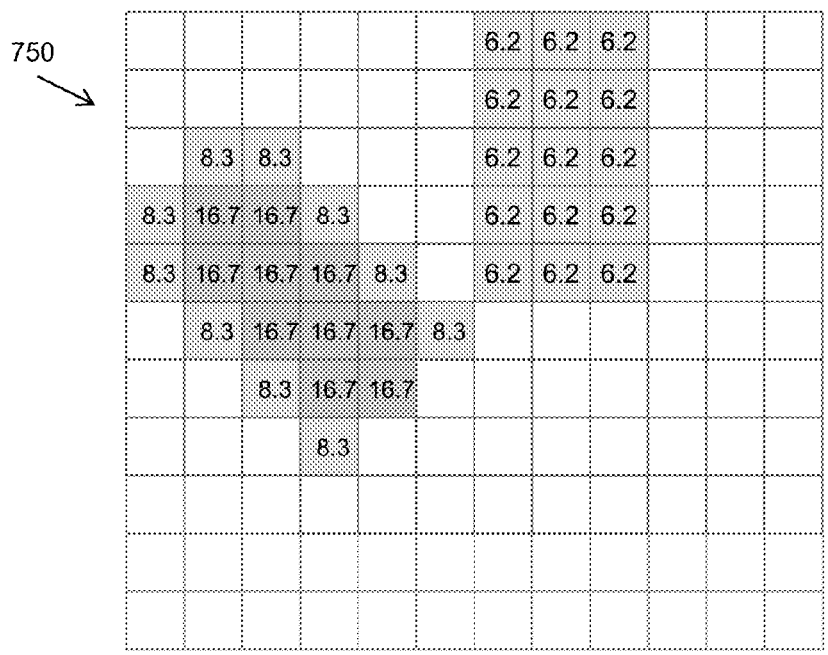

Similarly, a negative composite edge projection map 750 is illustrated in FIG. 11B. The negative composite map 750 represents a superposition of the negative edge projections 720, 730 of the first and second edges. As can be seen, the respective projected edge pixel intensities are reproduced on the same map 750. There is no overlapping region in this image. Thus, the maximum pixel intensity is 16.7, associated with a negative projection of the second edge.

Consequently, a difference between the maximum pixel intensity of the positive to negative weighted composite maps is 40:16.7 (about 2.4); whereas, a similar ratio for the non-weighted composite maps was 30:20 (about 1.5). The increased difference between intensities of the positive and negative weighted composite images suggests that a positive intensity object is associated with the first and second edges as indicated by the resulting pixel intensities. Had the image been of an opposite contrast, the negative weighted composite image would have exhibited a similar overlap to that shown in FIG. 11A. In general, positive and negative image intensities are 180° out of phase with one another, such that a negative intensity portrayed by a negative kernel would be equivalent to a positive intensity portrayed by a positive kernel.

Figure 12:
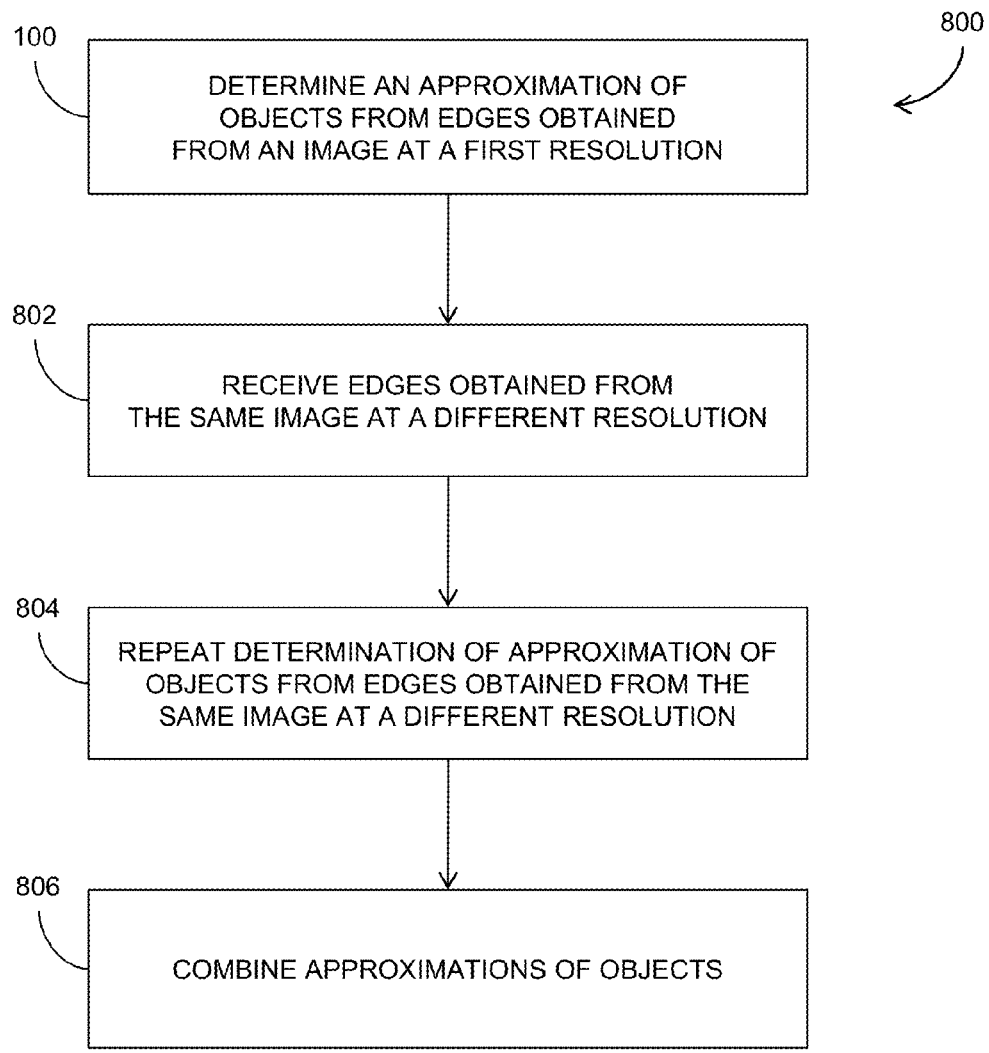
FIG. 12 illustrates a flow diagram of another embodiment of a process for reconstructing an image from image-detected edges.

An alternative embodiment of a process for approximating a portrayal of objects in an image from its filtered edges is illustrated in FIG. 12. An initial approximation of objects from edges is determined at 100, for example, applying the techniques illustrated and described in relation to FIG. 1. It is important to recognize that the received edges are obtained from an image having a first image resolution. This results in the generation of positive and negative weighted edge projection maps as described above. Edges derived from the same image, but at a different resolution, are obtained at 802. A similar process for determining an approximation of objects from edges is accomplished at 804, resulting in another version of the positive and negative weighted edge projection maps. Obtaining edges from an image at different resolutions provides some variation in the distance or size of edges detected. The process can be repeated in a likewise manner for additional different resolutions (e.g., more than two). Such variation offers refinement, for example, allowing for the detection of different sized targets. Both versions of like (i.e., positive and negative) weighted edge projection maps are combined at 806. Such combination may include a remapping or interpolation as may be required for proper alignment of different sized pixels. In some embodiments the process is repeated at least one more time for edges from the same image, but at yet another different resolution. The results can once again be combined in a similar manner. In some embodiments, the resolution varies from coarse to fine. Alternatively, in other embodiments, the resolution varies from fine to coarse.

One or more of the various modules described herein, such as the processor 404 (FIG. 4), the edge projecting module 504, the edge map generator 506, the edge ratio module 508, the weighted edge projecting module 510 and the weighted edge map generator 512 (FIG. 5) may represent or include any form of processing component, including general purpose computers, dedicated microprocessors, or other processing devices capable of processing electronic information. Examples of processors include digital signal processors (DSPs), application-specific integrated circuits (ASICs), field-programmable gate arrays (FPGAs), and any other suitable specific- or general-purpose processors. Although the ezkamples described herein relate to particular embodiments of the modules, each module may include a respective processing component, or more generally, any suitable number of processors.

Any of the modules may include memories (e.g., storage device 412), for example, storing related processing values and or instructions. Any such memories may include any collection and arrangement of volatile or non-volatile components suitable for storing data. For example, any such memories may include random access memory (RAM) devices, read-only memory (ROM) devices, magnetic storage devices, optical storage devices, or any other suitable data storage devices. In particular embodiments, any such memories may represent, in part, computer-readable storage media on which computer instructions and/or logic are encoded. In such embodiments, some or all the described functionality of the various modules, e.g., the jitter error measurement modules, timing error detection modules, and error correction modules may be provided by a processor (not shown) executing the instructions encoded on the described media.

In general, each of the modules, e.g., the processor 404 (FIG. 4), the edge projecting module 504, the edge map generator 506, the edge ratio module 508, the weighted edge projecting module 510 and the weighted edge map generator 512, may represent any appropriate combination of hardware and/or software suitable to provide the described functionality. Additionally, any two or more of the modules may represent or include common elements.

The above-described systems and processes can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include one or more mass storage devices for storing data (e.g., magnetic, magneto-optical disks, or optical disks). Alternatively or in addition, a computer can be operatively coupled to receive data from and/or transfer data to one or more such mass storage devices.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in, special purpose logic circuitry.

To provide for interaction with a user, the above described techniques can be implemented on a computing device having a display device (e.g., as part of the user interface 220). The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computing devices and having a client-server relationship to each other.

Communication networks can include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (CPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation, Safari® available form Apple Corporation). The mobile computing device includes, for example, a Blackberry® device or Apple® iPad® device.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for processing images, comprising:
   (a) receiving a plurality of edges derived from an image, each edge having positive and negative opposing sides, an edge magnitude and direction;
   (b) projecting from each edge, a scaled intensity value into a region abutting a positive side of the edge and into a region abutting a negative side of the edge;
   (c) generating positive and negative maps, wherein the positive maps include a combination of the projected scaled intensity values corresponding to the positive side of each edge and the negative maps include a combination of the projected scaled intensity values corresponding to the negative side of each edge;
   (d) determining for each edge a ratio of combined local intensity values in each of the positive and negative maps;
   (e) projecting for each edge, intensity values weighted by the ratio into a region abutting a positive side of the edge and intensity values weighted by the ratio into a region abutting a negative side of the edge; and
   (f) generating revised positive and negative maps, wherein the revised positive maps include a combination of the projected, weighted intensity values from the positive side of each edge and the revised negative maps include a combination of the projected, weighted intensity values from the negative side of each edge.

2. The method of claim 1, wherein projecting scaled intensity values into a region abutting either positive or negative side comprises:
   applying a bilinear kernel adapted to project intensity values away from an edge in a direction substantially normal to a preferred side of the edge; and
   scaling the bilinear kernel values according to the edge strength.

3. The method of claim 2, further comprising predetermining a plurality of bilinear kernels, each kernel aligned with a normal of the edge direction.

4. The method of claim 1, wherein generating each of the positive and negative maps comprises summing at each map pixel the separately projected intensity values obtained along the positive and negative side of each edge of the plurality of edges.

5. The method of claim 1, wherein determining the ratio of combined local intensity values comprises independently summing intensity values within a multi-pixel region of the plurality of edges in each of the positive and negative maps.

6. The method of claim 5, wherein for positive edges, determining the ratio comprises dividing the independently summed intensity values of the positive map by the independently summed intensity values of the negative map.

7. The method of claim 1, wherein the bilinear kernel is sized according to an application, and nominally sized according to a detected edge, extending lengthwise away from the edge.

8. The method of claim 1, further comprising:
   (g) receiving a plurality of edges derived from the same image at a different resolution;
   repeating steps (b) through (f); and
   combining the separately determined revised positive and negative maps for the edges derived from the same image at the different resolutions into combined positive and negative maps.

9. A non-transitory computer program product, tangibly embodied in an information carrier, the computer program product including instructions being operable to cause an image processor to:
   receive a plurality of edges derived from an image, each edge having positive and negative opposing sides and direction;
   project for each edge, a scaled intensity value into a region abutting a positive side of the edge and a scaled intensity value into a region abutting a negative side of the edge;
   generate positive and negative maps, wherein the positive maps include a combination of the projected scaled intensity values corresponding to the positive side of each edge and the negative maps include a combination of the projected scaled intensity values corresponding to the negative side of each edge;
   determine for each edge a ratio of combined local intensity values in each of the positive and negative maps;

project for each edge, intensity values weighted by the ratio into a region abutting a positive side of the edge and intensity values weighted by the ratio into a region abutting a negative side of the edge; and generate revised positive and negative maps, wherein the revised positive maps include a combination of the projected, weighted intensity values from the positive side of each edge and the revised negative maps include a combination of the projected, weighted intensity values from the negative side of each edge, at least some of the revised maps include features to aid in the unsupervised perception of objects in the image.

10. The non-transitory computer program product of claim 9, wherein projecting scaled intensity values into a region abutting either positive or negative side comprises:

application of a bilinear kernel adapted to project intensity values away from an edge in a direction normal to a preferred side of the edge; and scaling of the bilinear kernel values according to the edge strength.

11. The non-transitory computer program product of claim 9, wherein generating each of the positive and negative maps comprises summing at each pixel the separately projected intensity values obtained along the positive and negative side of each edge of the plurality of edges.

12. The non-transitory computer program product of claim 9, wherein determining the ratio of combined local intensity values comprises independently summing intensity values within a multi-pixel region of the plurality of edges in each of the positive and negative maps.

13. The non-transitory computer program product of claim 9, wherein for each positive edge, the ratio comprises the independently summed intensity values of the positive map divided by the independently summed intensity values of the negative map, each in the projection regions about the edge, and wherein for each negative edge, the ratio comprises the independently summed intensity values of the negative map divided by the independently summed intensity values of the positive map in the projection regions about the edge.

14. An apparatus for processing images, comprising:

means for receiving a plurality of edges derived from the image, each edge having positive and negative opposing sides and direction;

means for projecting for each edge, a scaled intensity value into a region abutting a positive side of the edge and scaled intensity value into a region abutting a negative side of the edge;

means for generating positive and negative maps, wherein the positive maps include a combination of the projected scaled intensity values corresponding to the positive side of each edge and the negative maps include a combination of the projected scaled intensity values corresponding to the negative side of each edge;

means for determining for each edge a ratio of combined local intensity values in each of the positive and negative maps;

means for projecting for each edge, intensity values weighted by the ratio into a region abutting a positive side of the edge and intensity values weighted by the ratio into a region abutting a negative side of the edge; and means for generating revised positive and negative maps, wherein the revised positive maps include a combination of the projected, weighted intensity values from the positive side of each edge and the revised negative maps include a combination of the projected, weighted intensity values from the negative side of each edge.

* * * * *